(12) United States Patent
Chen et al.

(10) Patent No.: US 10,285,422 B2
(45) Date of Patent: May 14, 2019

(54) COMPOSITION CONSISTING OF BREWER'S SPENT GRAINS AND POLYLACTIC ACID

(71) Applicant: SHI XIANG INDUSTRIAL CO., LTD., Miaoli County (TW)

(72) Inventors: Shih-Ming Chen, Miaoli County (TW); Yeng-Fong Shih, Miaoli County (TW); Wun-Cyuan Jhang, Miaoli County (TW)

(73) Assignee: SHI XIANG INDUSTRIAL CO., LTD., Miaoli County (TW)

( * ) Notice: Subject to any disclaimer, the term of this patent is extended or adjusted under 35 U.S.C. 154(b) by 0 days.

(21) Appl. No.: 15/972,226

(22) Filed: May 7, 2018

(65) Prior Publication Data
US 2018/0249743 A1 Sep. 6, 2018

Related U.S. Application Data

(62) Division of application No. 15/369,795, filed on Dec. 5, 2016.

(30) Foreign Application Priority Data

Apr. 22, 2016 (TW) .............................. 105112548 A

(51) Int. Cl.
*A23L 7/10* (2016.01)
*C08L 67/04* (2006.01)

(52) U.S. Cl.
CPC ............... *A23L 7/197* (2016.08); *C08L 67/04* (2013.01); *A23V 2002/00* (2013.01)

(58) Field of Classification Search
CPC ...... A23L 7/197; A23V 2002/00; C08L 67/04
See application file for complete search history.

(56) References Cited

U.S. PATENT DOCUMENTS

2013/0331518 A1* 12/2013 Immonen ................. C08J 5/045
525/54.21

OTHER PUBLICATIONS

Bledzki, A.K., etal; ANTEC, 2009, p. 1253-1259.*
Bamforth, C.W.; Brewing: New Technologies, 2006, p. 30-42.*
Battegazzore, D., etal; Cellulose, 2014, p. 1813-1821.*
Bergeret, A., et al; Green Composites from Natural Resources, 2013, Chapter 2, p. 11-43.*
Gannon, G., etal; Industrial Crops and Products, 2013, p. 173-185.*
Wu, C.S.; Polymer Degradation and Stability, 2012, p. 64-71.*

* cited by examiner

*Primary Examiner* — Robert S Jones
(74) *Attorney, Agent, or Firm* — Bruce Stone LLP; Joseph Bruce

(57) ABSTRACT

A composition consisting of BSG and PLA is produced by the following steps: processing brewer's spent grains; mixing the BSG with the PLA at a specific proportion; the BSG and the PLA are well mixed by a binder and then subjected to a granulation process to form plastic granules. Adding BSG to the PLA can reduce the use of PLA. Furthermore, the composition consisting of BSG and PLA and the method for making the same are further utilized to make utensils, bottles, cans, containers, parts and other biological plastic products to achieve the purpose of adding value to the BSG.

3 Claims, 2 Drawing Sheets

COMPOSITION CONSISTING OF BREWER'S SPENT GRAINS AND POLYLACTIC ACID

This is a divisional application of and claims priority to the U.S. application Ser. No. 15/369,795, the disclosure of which is incorporated by reference herein.

BACKGROUND

Field of the Invention

The present invention relates to an application of the brewer's spent grain, and more particularly to a composition consisting of brewer's spent grains and PLA (Polylactic Acid).

Related Prior Art

In Taiwan, approximately 18 billion plastic bags and 2 billion plastic straws are used every year, which causes serious environmental pollution. Besides, the raw material cost of all commercial petroleum refined products is so much influenced by the price of the petroleum. When oil price is soaring, the refining cost, out of question, is relatively high, and the refining itself is a high energy consumption and high pollution industry. Furthermore, if the plastic products cycling rate is low, many plastic wastes will be discarded, burned or buried, which will cause serious air, soil and water source pollution.

In recent years, bio-degradable green plastic products have been used to reduce the use of petroleum refined products. The raw material of the existing bio-plastic composites mostly come from PLA (Polyplastic Acid) and starch, especially, the PLA accounts for about half of the raw material used, and is widely used in the industry. However, PLA mainly uses the edible economic crops for human beings, such as corn, as the raw material, not only the crops availability is unreliable, but also the raw cost is relatively high.

Therefore, agricultural waste is used to replace or to reduce the use of the PLA and other bio-plastic. The most common agricultural waste includes: rice husk, wheat shell, corn stalk, bagasse, coconut, coconut shell, wood chips and coffee grounds . . . etc, among which, the rice husk and the coffee grounds are most widely used. However, the rice husk is normally used as agricultural litter, seedling, compost and fuelwood, making it commercial difficult. Coffee grounds can be obtained from a chain of coffee stores or convenience stores, but the coffee grounds pretreatment is difficult. The cost for the coffee grounds itself is cheap, however, the pretreatment cost is high, which consequently leads to increase in the coffee-grounds produced products.

The present invention has arisen to mitigate and/or obviate the afore-described disadvantages.

SUMMARY

The present invention is aimed at providing a composition consisting of BSG (brewer's spent grains) and PLA (Polylactic Acid), which is capable of reducing the use of PLA.

The present invention is aimed at providing a composition consisting of brewer's spent grains and PLA, wherein the bio-plastic containing brewer's spent grains of the present invention can be used to produce biomass plastic products, such as containers, bottles, parts, so that the brewer's spent grains can be recycled for value-added commercial products.

To achieve the above objects, a method for manufacturing a composition consisting of brewer's spent grains and polylactic acid, comprising the following steps:
   a step a of providing a raw material containing brewer's spent grains;
   a step b of providing a raw material containing polylactic acid;
   a step c of mixing the brewer's spent grains with the polylactic acid at a specific proportion; and
   a step d of providing a binder to enable the brewer's spent grains and the polylactic acid to be well mixed, and to maintain a desired tensile strength.

Preferably, the proportion of the brewer's spent grains is 10% to 30% by weight, the proportion of the polylactic acid is 70% to 90% by weight, and the proportion of the binder is 3% to 12% by weight.

Preferably, the proportion of the brewer's spent grains is 10% by weight, and the proportion of the binder is 8% by weight.

Preferably, the step a includes a pretreatment unit which uses a dehydration process, a desiccation process, a drying process, a grinding process and a sieving process to process the brewer's spent grains into brewer's spent grains which have a length-to-diameter ratio of 7.6 to 10.2, and a moisture content of the brewer's spent grains is controlled at 2% to 5%.

Preferably, the TS of the brewer's spent grains and the PLA is 30.5 MPa.

A composition in accordance with the present invention consists of predetermined proportions of brewer's spent grains and polylactic acid and a binder, wherein the binder enables the brewer's spent grains and the polylactic acid to be well mixed, and to maintain a desired tensile strength.

Preferably, the proportion of the brewer's spent grains is 10% to 30% by weight, the proportion of the polylactic acid is 70% to 90% by weight, and the proportion of the binder is 3% to 12% by weight.

Preferably, the proportion of the brewer's spent grains is 10% by weight, and the proportion of the binder is 8% by weight.

Preferably, a granulator includes a double screw extruder connected with a cutting machine, the cutting machine includes a polylactic acid feeding port, a brewer's spent grains feeding port and a discharge port, the cutting machine includes an input hole and an output hole, the discharge port communicates with the input hole, the double screw extruder mix the polylactic acid material and the brewer's spent grains and press them into plastic bars, and the bar-shaped plastic bars are cut into plastic granules by the cutting machine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

The present invention relates to a composition consisting of brewer's spent grains and PLA (Polylactic Acid).

More specifically, the present invention is designed to reduce the weight ratio of the exiting PLA by adding brewer's spent grains and a binder, to make the biomass plastic contain addition amounts of 10%~30% wt. of brewer's spent grains, 70%~90% wt. of PLA and 3%~12% wt. of binder.

Figure 1:
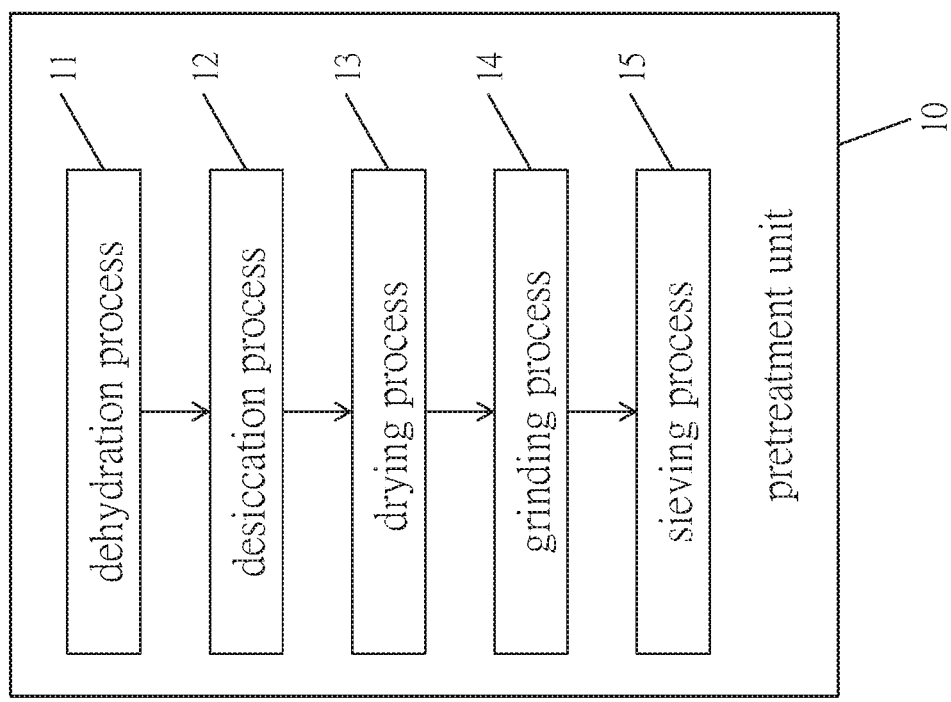
FIG. 1 is a block diagram showing the pretreatment unit of the present invention.

More specifically, the brewer's spent grains are the waste produced in the process of beer production, and have moisture content as high as 70%~80%. Therefore, the brewer's spent grains must be subjected to a pretreatment carried out by a pretreatment unit 10 before being mixed with the PLA, as shown in FIG. 1. The pretreatment unit 10 includes: a dehydration process 11, a desiccation process 12, a drying process 13, a grinding process 14 and a sieving process 15.

The dehydration process 11 includes preliminarily dehydrating the brewer's spent grains.

The desiccation process 12 includes putting the brewer's spent grains which have been preliminarily dehydrated into an air drying cabinet for further dehydration.

The drying process 13 includes putting the brewer's spent grains which have gone through the desiccation process 12 into an oven at a temperature of 110 Celsius degrees for 8 hours, and performing a moisture content test.

The grinding process 14 includes putting the brewer's spent grains which have gone through the drying process 13 into a grinder for grinding for 10 seconds.

The sieving process 15 includes sieving the brewer's spent grains which have gone through the grinding process 14 with sieves of 20, 40, 50, 60 mesh, thus obtaining brewer's spent grains of various L/D (length to diameter) ratios.

Please see the L/D ratio experimental data of the brewer's spent grains as shown in the below table 1.

The L/D ratio of the brewer's spent grains

TABLE 1

| Fiber size | (L/D) ratio |
|---|---|
| 20 Mesh | 7.6 |
| 40 Mesh | 9 |
| 50 Mesh | 10.2 |
| 60 Mesh | 184.8 (um) |

Table 1 shows that the L/D ratio of the brewer's spent grains is 7.6 when a 20 mesh sieve is used, the L/D ratio of the brewer's spent grains is 9.0 when the sieve is 40 mesh, and the L/D ratio of the brewer's spent grains is 10.2 when the sieve is 50 mesh. The diameter of the brewer's spent grains will be 184.8 μm when the sieve is 60 mesh, and the brewer's spent grains are actually in the form of particles rather than grains, and therefore there is no L/D ratio when the brewer's spent grains become particles. The L/D ratio ranges from 7.6 to 10.2 when the brewer's spent grains have a size larger than 50 meshes. It can be learned from the experimental data that there is a reinforcement effect when the brewer's spent grains which have a L/D ratio of 7.6~10.2 are mixed with the PLA, and the reinforcement effect will be better when the L/D ratio is larger than 9.

Please see the below table 2 for the experimental data obtained from the experiments made with various amounts of added brewer's spent grains.

TABLE 2

| Amount of added grains | TS (MPa) |
|---|---|
| 0% (Totally PLA) | 50.7 |
| 10% | 30.5 |
| 20% | 21.5 |
| 30% | 18.3 |

The table 2 shows that the TS (tensile strength) is 50.7 MPa when no brewer's spent grains are added, TS is 30.5 MPa when the addition amount (amount of the added brewer's spent grains) is 10% by weight, and TS is 21.5 MPa and 18.3 MPa when the addition amounts are 20% and 30% by weight, respectively. The TS is greater than 15 MPa when the addition amount ranges from 10% to 30% by weight, which is very close to the TS (tensile strength) of 23.4 MPa when no brewer's spent grains are added, more specifically, when the addition amount is 10% by weight, the TS is closest to 50.7 MPa. It shows that the appropriate addition amount of the brewer's spent grains is 10%~30% by weight because the corresponding TS values are all greater than 15 MPa. More specifically, the TS is closest to 50.7 MPa which is the optimum value, when the addition amount is 10% by weight.

Please see the below table 3 for the experimental data of the influence of different moisture contents on the tensile strength.

TABLE 3

| Moisture content | TS (MPa) |
|---|---|
| 2% | 30.5 |
| 5% | 25.3 |
| 10% | 19.7 |
| 20% | 13.8 |

The experimental data as shown in Table 3 shows that different moisture contents of the brewer's spent grains truly affect the TS. With the increase of the moisture content, the TS showed a downward trend, therefore, it is obvious that the less the moisture content of the brewer's spent grains, the stronger the TS will be. The moisture content can be reduced to 2%~5% by the drying process 13, and the resultant TS will be greater than 20 MPa. When the moisture content is 2%, the TS is 30.5 MPa, and when the moisture content is 5%, the TS is 25.3 MPa. Therefore, the TS reaches the best condition when the moisture content ranges from 2% to 5%, and will reach the maximum value when the moisture content is 2%.

Finally, please see the below table 4 which shows the experimental data for various amounts of added binder under the condition that the addition amount of the brewer's spent grains is 10% to 30%, and the moisture content is 2% to 5%.

TABLE 4

| Amount of added binder | TS (MPa) |
| --- | --- |
| 0% | 18.4 |
| 3% | 20.8 |
| 5% | 25.3 |
| 8% | 30.5 |
| 12% | 27.8 |

The experimental data as shown in Table 4 shows that all the detected TS value is lower than 20 MPa when the addition amount (the amount of the added binder) of the binder is 0% by weight. The reason is the addition amount of the binder is insufficient. When the addition amount of the binder is too low, it will weaken the bonding between the brewer's spent grains and the PLA, and the tensile strength. When the addition amounts of the binder are 3% to 12% by weight, the TS values are 20.8 MPa to 27.8 MPa. More specifically, when the addition amount of the binder is 8% by weight, the TS values is 30.5 MPa which is the optimum value. When the addition amount of the binder is 12% by weight, the TS slightly decreases but is still 27.8 MPa. Therefore, the addition amount of the binder must range from 3% to 12% by weight in order to maintain the bonding and the TS of the brewer's spent grains and the PLA at a level close to 20 MPa.

Figure 2:
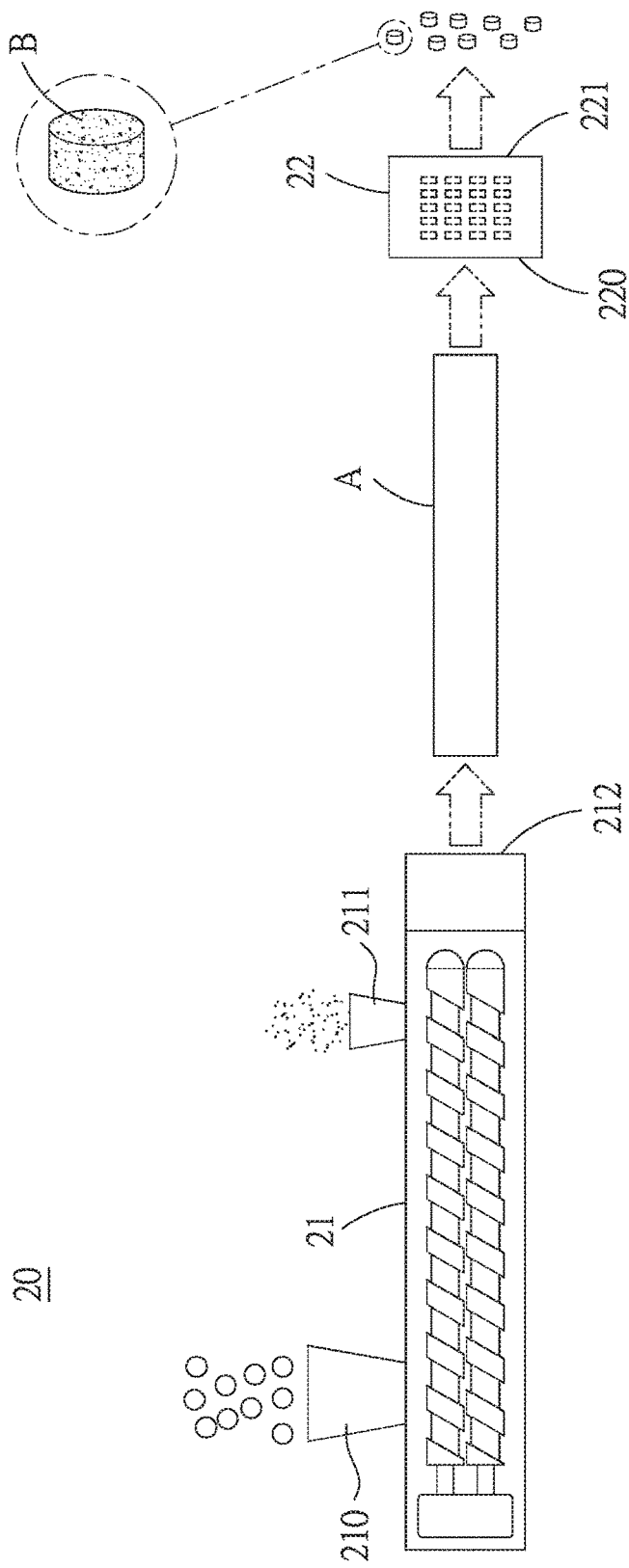
FIG. 2 is an illustrative view showing the structure of a granulator in accordance with the present invention.

Referring then to FIG. 2, which is an illustrative view showing the structure of a granulator 20 in accordance with the present invention, wherein the granulator 20 includes a double screw extruder 21 connected with a cutting machine 22. The cutting machine 22 includes a PLA feeding port 210, a brewer's spent grains feeding port 211 and a discharge port 212. The cutting machine 22 includes an input hole 220 and an output hole 221. The discharge port 212 communicates with the input hole 220. PLA material and the brewer's spent grains are fed through the PLA feeding port 210 and the brewer's spent grains feeding port 211, respectively, into the double screw extruder 21, in which, the PLA material and the brewer's spent grains are mixed and then extruded into a plastic bars A. Then, the bar-shaped plastic bars A are fed from the discharge port 212 to the input hole 220 of the cutting machine 22 and cut into plastic granules B which are used as raw materials to produce desired products, such as containers, bottles, parts.

It can be learned from the above description that a method for manufacturing a composition consisting of brewer's spent grains and polylactic acid in accordance with the present invention comprises the following steps:

Step a: providing a raw material containing brewer's spent grains;

Step b: providing a raw material containing petrochemical plastic;

Step c: mixing the brewer's spent grains with the PLA at a proportion of 10% to 30% wt. of brewer's spent grains and 70% to 90% wt. of petrochemical plastic; and Step d: providing a binder to enable the brewer's spent grains and the PLA to be evenly mixed, and to maintain a desired tensile strength, wherein an addition amount of the binder is 3% to 12% by weight.

It can be learned from the above method and the tables 1-4 that the optimum addition amount of the brewer's spent grains is 10% to 30% by weight, and the L/D ratio of the brewer's spent grains is 7.6 to 10.2. The brewer's spent grains whose optimum value of the L/D ratio is larger than 9 have a better reinforcement effect. The moisture content of the brewer's spent grains is preferably controlled at 2%~5% in order to have a better TS, and optimally controlled at 2%.

In this embodiment, the binder is a high density polyethylene which can be produced at lower pressure and contain more long chain, and is used to produce various plastic products. More particularly, the biomass plastic containing brewer's spent grains of the present invention can be to produce biomass plastic products, such as containers, bottles, parts, so that the brewer's spent grains can be recycled.

The present invention relates to a composition consisting of brewer's spent grains and PLA (polylactic acid). After going through the pretreatment, including the dehydration process, the desiccation process, the drying process, the grinding process and the sieving process, the dried brewer's spent grains are mixed with PLA at a specific proportion, then a binder which is selected from a high density polyethylene is used to enable the brewer's spent grains and the PLA to be evenly mixed, and finally the double screw extruder 21 and the cutting machine 22 are used to produce biomass plastic granules. The present invention is capable of reducing the use of PLA and the plastic pollution by adding brewer's spent grains to the petrochemical plastic.

While we have shown and described various embodiments in accordance with the present invention, it is clear to those skilled in the art that further embodiments may be made without departing from the scope of the present invention.

What is claimed is:

1. A composition comprising brewer's spent grains and polylactic acid;
    wherein a proportion of the brewer's spent grains is 10% to 30% by weight, and a proportion of the polylactic acid is 70% to 90% by weight;
    the brewer's spent grains which have a length-to-diameter ratio of 7.6 to 10.2, and a moisture content of the brewer's spent grains is controlled at 2% to 5%.

2. The composition as claimed in claim 1, wherein the composition further includes a binder, and a proportion of the binder is 3% to 12% by weight.

3. The composition as claimed in claim 2, wherein the proportion of the brewer's spent grains is 10% by weight, and the proportion of the binder is 8% by weight.

* * * * *